United States Patent
Azam et al.

(10) Patent No.: US 11,476,717 B2
(45) Date of Patent: Oct. 18, 2022

(54) TRANSMISSION OF WIRELESS POWER

(71) Applicant: Hewlett-Packard Development Company, L.P., Spring, TX (US)

(72) Inventors: Syed S Azam, Spring, TX (US); Chi So, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/648,709

(22) PCT Filed: Sep. 29, 2017

(86) PCT No.: PCT/US2017/054296
§ 371 (c)(1),
(2) Date: Mar. 19, 2020

(87) PCT Pub. No.: WO2019/066899
PCT Pub. Date: Apr. 4, 2019

(65) Prior Publication Data
US 2020/0287424 A1 Sep. 10, 2020

(51) Int. Cl.
*H02J 50/40* (2016.01)
*H02J 50/80* (2016.01)
*H02J 50/70* (2016.01)

(52) U.S. Cl.
CPC .............. *H02J 50/40* (2016.02); *H02J 50/70* (2016.02); *H02J 50/80* (2016.02)

(58) Field of Classification Search
CPC .......... H02J 50/40; H02J 50/402; H02J 50/80; H02J 50/70
See application file for complete search history.

(56) References Cited

U.S. PATENT DOCUMENTS

| 8,314,513 | B2 * | 11/2012 | Aoyama | H02M 3/337 307/104 |
| 9,190,851 | B2 * | 11/2015 | Kim | H02J 50/80 |
| 9,312,714 | B2 * | 4/2016 | Takagi | H02J 5/005 |
| 9,537,345 | B2 | 1/2017 | Wang | |
| 10,069,339 | B2 * | 9/2018 | Tani | H02J 50/80 |

(Continued)

FOREIGN PATENT DOCUMENTS

EP   3148052 A1   3/2017

OTHER PUBLICATIONS

"Designing Efficient Wireless Power Transfer Networks", Golinski, M., May 28, 2015, 101 pages http://www.es.ewi.tudelft.nl/msc-theses/2015-Golinski.pdf.

(Continued)

*Primary Examiner* — Thomas J. Hiltunen
(74) *Attorney, Agent, or Firm* — Conley Rose PC

(57) ABSTRACT

An example system includes a power collection engine. The power collection engine is to convert wireless electromagnetic energy into wired electrical energy. The system also includes a connection management engine. The connection management engine is to communicate with a first transmitter to cause the first transmitter to provide first power to the power collection engine. The connection management engine is to communicate with a second transmitter to cause the second transmitter to provide second power that avoids interference with the first power to the power collection engine.

13 Claims, 6 Drawing Sheets

(56) References Cited

U.S. PATENT DOCUMENTS

| | | | |
|---|---|---|---|
| 10,128,660 B1 * | 11/2018 | Apte | H02J 50/12 |
| 10,447,092 B2 * | 10/2019 | Zeine | G01S 11/00 |
| 10,523,033 B2 * | 12/2019 | Leabman | H02J 5/005 |
| 10,778,043 B2 * | 9/2020 | Swan | H02J 50/40 |
| 2010/0033021 A1 | 2/2010 | Bennett | |
| 2013/0026982 A1 | 1/2013 | Rothenbaum | |
| 2013/0328417 A1 * | 12/2013 | Takeuchi | H02J 7/025 |
| | | | 307/149 |
| 2014/0206384 A1 | 7/2014 | Kim et al. | |
| 2016/0359375 A1 | 12/2016 | Lee et al. | |
| 2017/0005520 A1 | 1/2017 | Seine et al. | |
| 2017/0149294 A1 | 5/2017 | Wight et al. | |
| 2020/0389058 A1 * | 12/2020 | Boulanger | H02J 50/12 |

OTHER PUBLICATIONS

"Wireless Charger Networking for Mobile Devices: Fundamentals, Standards, and Applications", Lu, et al., Dec. 9, 2014, 16 pages, https://arxiv.org/pdf/1410.8635.pdf.

* cited by examiner

TRANSMISSION OF WIRELESS POWER

BACKGROUND

A computing device may include a processor and a computer-readable medium. The computer-readable medium may include instructions to be executed by the processor. The processor may execute the instructions to perform operations based on data stored on the computer-readable medium or inputs received from a user or a network. For example, the computing device may include or be communicatively coupled to a mouse, touchpad, touch screen, keyboard, etc. to provide inputs to the computing device. The computing device may be communicatively coupled to the network wirelessly or by a wire. The computing device may output information to the user or the network, for example, based on the results of the operations. For example, the computing device may include or may be communicatively coupled to a display, a speaker or headphones, a printer, or the like, which may output the information.

DETAILED DESCRIPTION

Figure 1:
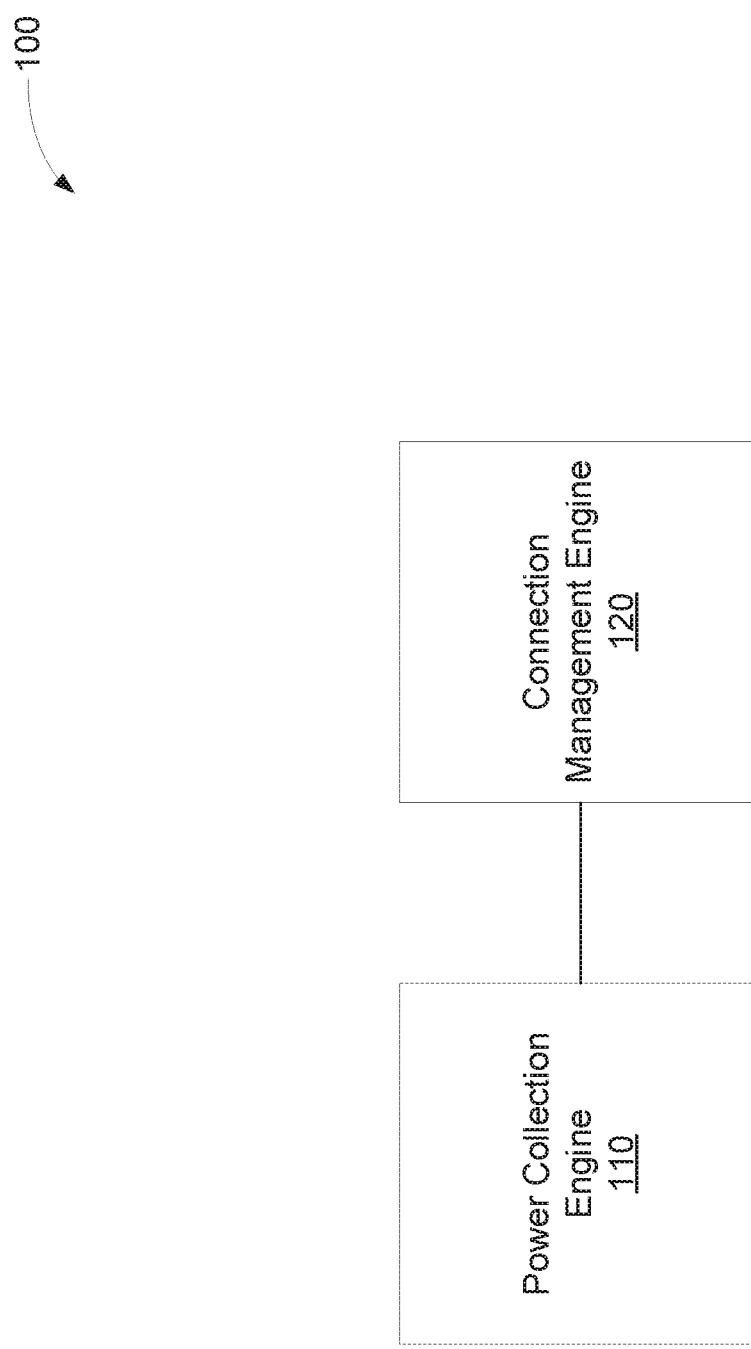
FIG. 1 is a block diagram of an example system to receive efficiently delivered wireless power.

The computing device, a device communicatively coupled to the computing device, a standalone device, or the like may operate using power received from a rechargeable power source, such as a battery, capacitors, super-capacitors, etc. The device may include a mobile device (e.g., a notebook, a tablet, a phone, etc.), a smart device (e.g., a watch, clothes, etc.), or the like. The device may include an input or output device, such as a mouse, a keyboard, a speaker (e.g., a digital assistant), headphones, a virtual reality (VR), augmented reality (AR), or Bluetooth headset, a printer, etc. The device may include a power bank, a camera, a light, a motion sensor, a smoke detector, a mobile robot, a television or audio device remote, etc. When an energy store is depleted from the rechargeable power source, the rechargeable power source may receive power from another power source. For example, a user may connect the rechargeable power source to wall power, another rechargeable power source, or the like to store additional energy in the rechargeable power source. The user may find it inconvenient or stressful to worry about the energy levels of the rechargeable power sources in the user's various devices.

A wireless power source may deliver power to the rechargeable power source while the rechargeable power source is located remotely from the wireless power source. The wireless power source may deliver the power via inductive coupling or capacitive coupling, resonant inductive or capacitive coupling, magnetodynamic coupling, far-field radiation of electromagnetic energy, or the like. The rechargeable power source may receive power as long as it is within a particular distance of the wireless power source. Accordingly, the rechargeable power source may receive power with little or no effort on the part of the user. The user may come near or place the rechargeable power source near the wireless power source to charge the rechargeable power source, or the user may come close enough to the wireless power source to charge the rechargeable power source without explicitly intending to do so. The user may still find coming within the particular distance of the wireless power source inconvenient.

A plurality of wireless power source may deliver power to the rechargeable power source over a greater area. The plurality of wireless power sources may be spread over an area, so the rechargeable power source can receive power anywhere within the area. The area covered by the plurality of wireless power sources may be larger than the area covered by a single wireless power source. In an example, the plurality of wireless power sources may cover a substantial portion or all of a home, a business, or the like. When installing a plurality of wireless power sources, coverage areas may overlap, which may potentially cause interference, or the wireless power sources may be placed far enough apart to prevent interference, which may result in dead zones between the coverage areas. In addition, a wireless power source may deliver power to numerous devices, which may limit the amount of power provided to a device of interest to the user. The user may desire to receive power at the device of interest without dead zones or without interference diminishing the amount of power received.

FIG. 1 is a block diagram of an example system 100 to receive efficiently delivered wireless power. The system 100 may include a power collection engine 110. As used herein, the term "engine" refers to hardware (e.g., a processor, such as an integrated circuit or other circuitry, analog circuitry, etc.) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware.

The power collection engine 110 may convert wireless electromagnetic energy into wired electrical energy. In an example, the power collection engine 110 a receiving element, such as an antenna, an inductive element (e.g., a coil), a capacitive element (e.g., a plate), an armature, or the like. The receiving element may produce a voltage or current from the wireless electromagnetic energy incident on the receiving element. The power collection engine 110 may include matching circuitry, circuitry to rectify the received energy, circuitry to covert a voltage or current of the received energy to a different value, or the like.

The system 100 may include a connection management engine 120. The connection management engine 120 may communicate with a first transmitter to cause the first transmitter to provide first power to the power collection engine 110. For example, the connection management engine 120 may communicate with the first transmitter to determine parameters for the transfer of the first power. The connection management engine 120, the first transmitter, or both may determine the parameters based on the communication. The communication may be unidirectional or bidirectional.

The connection management engine 120 may communicate with a second transmitter to cause the second transmitter to provide second power that avoids interference with the first power to the power collection engine 110. For example, the connection management engine 120 may communicate with the second transmitter to determine parameters for the transfer of the second power to the power collection engine 110. The parameters for the transfer of the second power may be selected to prevent interference with the transfer of the first power. The connection management engine 120, the second transmitter, or both may determine the parameters based on the communication. The communication may be unidirectional or bidirectional.

Figure 2:
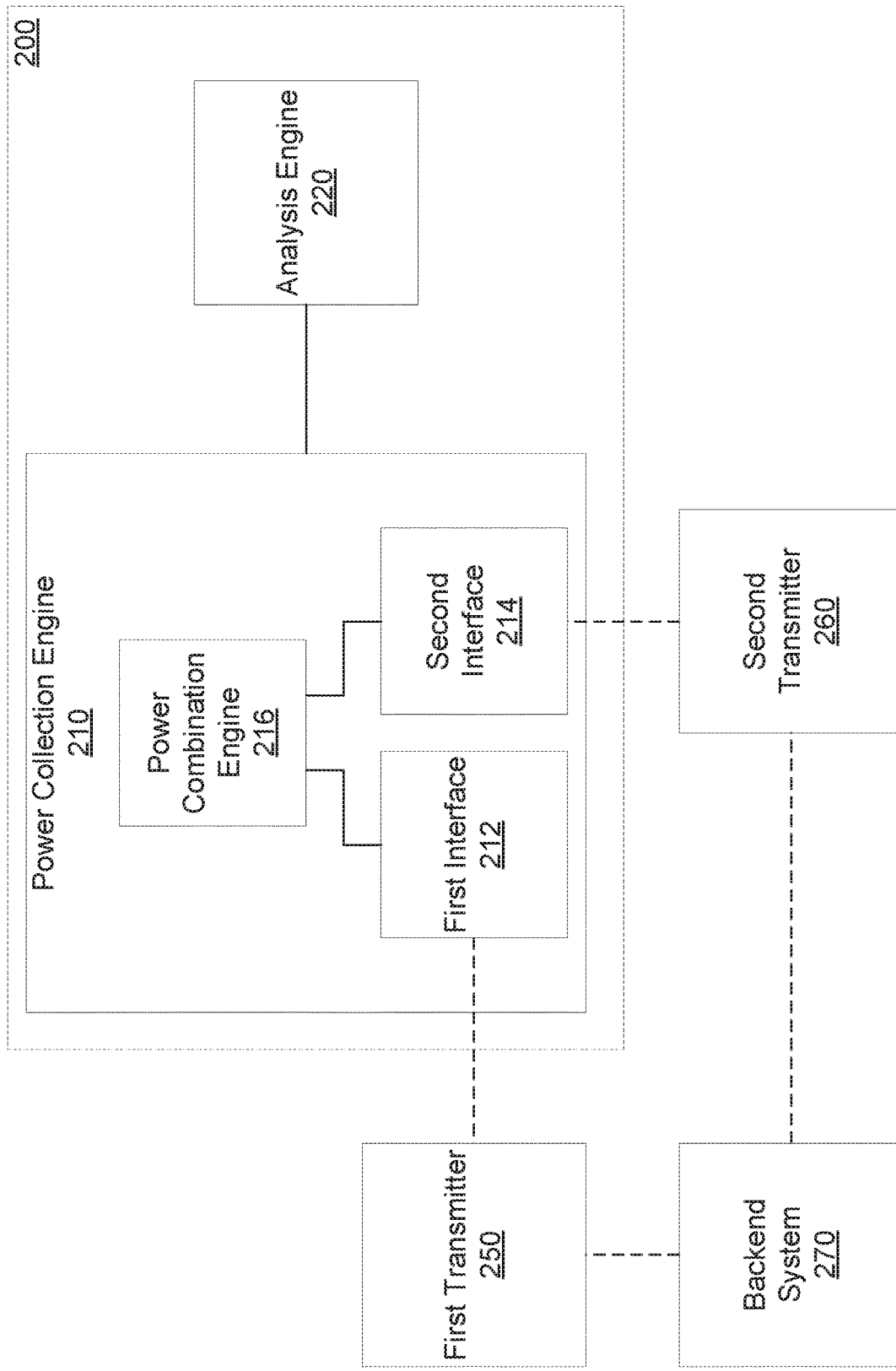
FIG. 2 is a block diagram of an environment including another example system to receive efficiently delivered wireless power.

FIG. 2 is a block diagram of an environment 205 including another example system 200 to receive efficiently delivered wireless power. The system 200 may include a power collection engine 210 to convert wireless electromagnetic energy into wired electrical energy. For example, the power collection element 210 may include a receiving element, circuitry, or the like. The power collection element 210 may be able to receive wireless electromagnetic energy from a plurality of transmitters 250, 260. The power collection element 210 may include a first interface 212 to receive first power and a second interface 214 to receive second power. For example, the power collection element 210 may include multiple receiving elements, circuitry to receive multiple wireless electromagnetic energy signals, or the like.

The system 200 may include a power combination engine 216 electrically coupled to the first and second interfaces 212, 214. The power combination engine 216 may combine the first and second power. For example, the power combination engine 216 may convert the first and second power to voltage or currents that can be combined. The power combination engine 216 may convert the first and second power to substantially the same voltage. As used herein, the term "substantially" refers to a value within a particular percentage of another (e.g., 0.5%, 1%, 2%, 5%, 10%, etc.). In some examples, the wireless electromagnetic energy signals may have parameters that allow the power collection element 210 to receive the wireless electromagnetic energy from multiple transmitters 250, 260 without multiple receiving elements, without circuitry specifically design to receive multiple signals, without a power combination engine 216, or the like.

The system 200 may include a connection management engine 220. The connection management engine 220 may communicate with a first transmitter 250 to cause the first transmitter 250 to provide first power to the power collection engine 210. The connection management engine 220 or the first or second transmitters 250, 260 may communicate at the same frequency as the wireless electromagnetic energy being transferred or at a different frequency. The first or second transmitters 250, 260 may modulate or the connection management engine 220 may backscatter modulate the wireless electromagnetic energy. In an example, the connection management engine 220 may transmit a request to the first transmitter 250 to provide the first power to the power collection engine 210. For example, the connection management engine 220 may initiate communication with the first transmitter 250 to request the first power. The transmitters 250, 260 or a backend system 270 may implement an interrupt driven model to react to received requests. In some examples, the first transmitter 250 may transmit power substantially continuously or broadcast indications that power is available, and the connection management engine 220 may communicate with the first transmitter 250 in response to the power collection engine 210 detecting the transmitted power or broadcasts.

In the request or responsive communication or a later communication, the connection management engine 220 may indicate power is requested, capabilities of the power collection engine 210, requested characteristics for the first power, authentication information or a security token, a power level, or the like to the first transmitter 250. In response to the communication, the first transmitter 250 may begin transmitting power, adjust a current transmission of power, or the like. When the connection management engine 220 communicates authentication information to the first transmitter, the first transmitter 250 or the backend system 270 may verify the authentication information and provide power based on the authentication information being verified. The first transmitter 250 or the backend system 270 may determine whether the system 200 is authorized to receive power, e.g., by determining whether a subscription is active, whether the system 200 has received more energy than a maximum allowed by the subscription, or the like. The first transmitter 250 may transmit wireless electromagnetic energy receivable by the power collection engine 210, The first transmitter 250 may select characteristics for the first power that maximize power transfer to the power collection engine 210, that maximize the efficiency of power transferred to the power collection engine 210, or the like given any constraints on the first transmitter 250, such as capabilities of the first transmitter 250, other power transmissions by the first transmitter 250, etc.

The connection management engine 220 may communicate with a second transmitter 260 to cause the second transmitter 260 to provide second power to the power collection engine 210. The coverage areas of the first and second transmitter 250, 260 may overlap, which may allow for redundancy and load balancing among the transmitters 250, 260. The system 200 may be at a location covered by both transmitters 250, 260. The connection management engine 220 may communicate with the second transmitter 260 to cause the second transmitter 260 to provide second power that avoids interference with the first power. For example, the connection management engine 220 may transmit a characteristic of the first power to the second transmitter 260. The characteristic may be usable to avoid interfering with the first power, may be an amount of the first power, or the like. Based on the characteristic of the first power, the second transmitter 260 may select a characteristic of the second power that prevents interference with the first power. In some examples, the connection management engine 220 may transmit an identifier for the system 200, an identifier for the first transmitter 250, or the like. The second transmitter 260 may determine characteristics of the first power based on the identifier, for example, by communicating with the first transmitter 250, with the backend system 270 (e.g., a backend server, a system communicatively coupled to the first transmitter 250, etc.), or the like. The characteristic may include timing information, frequency information, spatial information, phase information, resonance information (e.g., a resonance parameter, etc.), or the like. In the examples described herein, functionality ascribed to the transmitters 250, 260 may be performed by the backend system 270 or vice versa.

The connection management engine 220 may communicate with the second transmitter 260 to cause the second transmitter 260 to provide the second power in a time, a frequency, or a spatial arrangement different from that of the first power. For example, the first transmitter 250 may transmit the first power over a first time interval and not transmit the first power over a second time interval. The first and second time interval may repeat periodically, aperiodically, or the like. The second transmitter 260 may transmit the second power in the second time interval but not in the first time interval. The first transmitter 250 may transmit the first power at a first frequency, and the second transmitter 260 may transmit the second power at a second frequency different from the first frequency. The connection management engine 220 may indicate the first and second frequencies to the power collection engine 210, and the power collection engine 210 may tune the first interface 212 to receive the first power and the second interface 214 to receive the second power. The power collection engine 210 may receive the first and second power at the first and second frequencies over a single interface.

The first transmitter 250 may transmit the first power with a first spatial arrangement, and the second transmitter 260 may transmit the second power with a second spatial arrangement that does not interfere with the first spatial arrangement. In an example, the first transmitter 250 may transmit a directional signal towards a first receiving element, and the second transmitter 260 may transmit a directional signal towards a second receiving element. The first interface 212 may include the first receiving element, and the second interface 214 may include the second receiving element. In some examples, the first or second transmitter 250, 260 may include multiple transmitting elements, or the power collection engine 210 may include multiple receiving elements. The spatial diversity among the transmit or receive elements may reduce the interference or reduce the probability the interference is totally destructive. The connection management engine 220 may indicate channel state information, information about the received power (e.g., at each receiving element), or the like to the first or second transmitters 250, 260 to allow them to adjust the characteristics of the transmitted power to reduce interference (e.g., by adjusting a phase at one transmitting element or at multiple transmitting elements).

In some examples, the connection management engine 220 may transmit information about the phase of the first or second power to the first or second transmitters 250, 260. The phase may be relative, so the second transmitter 260 may transmit the second power at different phases at different times (e.g., a first phase at a first time, a second phase at a second time, etc.). The connection management engine 220 may report a signal strength, an amount of received power, or the like to the second transmitter 260 for the different phases. The connection management engine 220 may report information for each receiving element. The second transmitter 260 may then select a phase for the second power that minimizes interference (e.g., a phase for each transmitting element). The second transmitter 260 may be providing power to multiple devices, so it may select a phase that maximizes average power deliver, minimizes the interference at the device experiencing maximum interference, or the like. In some examples, the second transmitter 260 may individually adjust the phase transmitted to each device. The first transmitter 250 may also, or instead adjust a phase of the first power.

The connection management engine 220 may indicate an amount of the second power to the first transmitter 250. The power collection engine 210 may receive an adjusted first power from the first transmitter 250 based on the amount of the second power. For example, the system 200 may be able to receive the second power from the second transmitter 260, but another device may be unable to receive power from the second transmitter 260 and may instead rely wholly on the first transmitter 250, The first transmitter 250 may deliver more power to the other device and reduce the amount of power delivered to the system 200. As a result, the total amount of power delivered by the first and second transmitters 250, 260 may be higher, the time to charge all devices may be lower, or the like. The connection management engine 220 may indicate an amount of power transmitted for the second power, an amount of power received for the second power, a frequency of transmission of the second power, or the like. The connection management engine 220 may indicate an instantaneous or average power transmitted or received. The first transmitter 250 may adjust the amount of power transmitted, a frequency of transmission, or the like. In some examples, the first transmitter 250 may determine the amount of the second power by communicating with the second transmitter 260, by communicating with the backend system 270, or the like.

The connection management engine 220 or the second transmitter 260 may determine or predict how the first transmitter 250 will adjust the first power in response to delivery of the second power. The connection management engine 220 or the second transmitter 260 may select a characteristic of the second power, such as an amount of the second power, based on the determined or predicted adjustment to the first power. The connection management engine 220 or the second transmitter 260 may determine how the first transmitter 250 will adjust the first power by communicating with the first transmitter 250. The connection management engine 220 or the second transmitter 260 may determine or predict the adjustment to the first power based on predetermined criteria to be used by the first transmitter 250 to make the adjustment. For example, the connection management engine 220, the first transmitter 250, or the second transmitter 260 may determine a characteristic of the first power or the second power (e.g., an amount of the first power or the second power, etc.) based on a signal strength of the first power or the second power, a load on the first or second transmitter 250, 260 (e.g., a number of devices receiving power, an amount of power being delivered, etc.), or the like.

The first transmitter 250, the second transmitter 260, or the backend system 270 may determine an amount of power to deliver to the power collection engine 210 based on any of various criteria. For example, the criteria may include a priority of the system 200. The connection management engine 220 may decide whether to indicate the system 200 is high priority. The first or second transmitter 250, 260 or the backend system 270 may determine whether the system 200 is high priority, for example, based on identifying information from the connection management engine 220, A manufacturer (e.g., of the system 200, of the transmitters 250, 260, etc.) may determine the priority, or a user may determine the priority. The transmitters 250, 260 may deliver a larger amount of power to high priority devices than to low priority devices. The criteria may include a mobility of the system 200, or the priority may be determined based on a mobility of the system 200. For example, a smoke detector or a remote control may be immobile or may not move too far, but a mobile or smart device may be more likely to leave a coverage area. The transmitters 250, 260 may deliver a larger amount of power to high mobility devices than to low mobility or immobile devices.

The criteria may include a level of charge of a rechargeable power source in the system 200 (e.g., an amount of energy stored, a percentage charged, a time until completely depleted, etc.), a capacity of the rechargeable power source, an amount of energy to fully charge the rechargeable power source, or the like. For example, the transmitters 250, 260 may deliver a larger amount of power to a device with a lower level of charge or that will take more energy to reach a fully charged state than to a device with a higher level of charge or that will take less energy to reach the fully charged state. The transmitters 250, 260 may deliver a larger amount of power to a device that will be completely depleted sooner than to a device that has more time until it is completely depleted. The first transmitter 250, the second transmitter 260, or the backend system 270 may determine changes to the amount of power to deliver to the power collection engine 210 as the criteria change. For example, the transmitters 250, 260 may reduce the amount of power the transmitters 250, 260 are delivering or stop delivering power based on the system 200 reaching a particular charge level or percentage.

The criteria may include when the system 200 arrived in a coverage area (e.g., a coverage area of a particular transmitter, a coverage area of a plurality of associated transmitters, etc.). The transmitters 250, 260 may provide a larger amount of power to a device that arrives first, a larger amount of power to a device that arrives last, or the like. The criteria may include a number of devices being serviced by the transmitter 250, 260 or the amount of power being delivered by the transmitter 250, 260 to devices other than the system 200. For example, there may be a limit to the number of devices to which the transmitter 250, 260 can provide power or a limit to the amount of power the transmitter 250, 260 can provide. The transmitters 250, 260 may provide a larger amount of power when fewer devices are receiving or the transmitters 250, 260 are providing less power to other devices than when more devices are receiving power or the transmitters 250, 260 are providing more power to other devices. The criteria may include a signal strength at the system 200, an efficiency at which power is delivered to the system 200, an amount of transmission losses for the system 200, or the like. The transmitters 250, 260 may provide a larger amount of power to a closer, more efficient, or less lossy system 200, or the transmitters 250, 260 may provide a larger amount of power to a more distant, less efficient, or more lossy system 200.

The criteria may include whether another transmitter 250, 260 can deliver power or the number of transmitters 250, 260 that can deliver power to the system 200. For example, the transmitters 250, 260 may deliver a larger amount of power to a device receiving power from a single transmitter or fewer transmitters than to a device receiving power from multiple transmitters or more transmitters. The criteria may include the amount of power being received from another transmitter. The transmitters 250, 260 may deliver a larger amount of power to a device receiving less power from another transmitter than to a device receiving more power. The transmitters 250, 260 or backend system 270 may use a combination of the previously discussed criteria. For example, the transmitters 250, 260 may give priority to some criteria over other criteria, may balance conflicting criteria, may apply identical or different weights to the criteria, or the like.

The connection management engine 220 or the transmitters 250, 260 may decide whether the transmitters 250, 260 should deliver power based on an efficiency, a signal strength, an amount of loss, or the like. For example, the connection management engine 220 or the transmitters 250, 260 may determine whether the efficiency, signal strength, amount of loss, or the like may satisfy a threshold. The threshold may vary depending on whether the power collection engine 210 is receiving power from another transmitter 250, 260 or how much power the power collection engine 210 is receiving. For example, the transmitter 250, 260 may provide the power despite a low efficient, poor signal strength, large amount of loss, or the like if the power collection engine 210 is receiving little or no other power.

The connection management engine 220 or the transmitters 250, 260 may perform a handoff or handover to change which transmitter 250, 260 is providing the power to the power collection engine 210, The connection management engine 220 may communicate with the transmitters to cause the first transmitter 250 to stop providing power to the power collection engine 210 and for the second transmitter 260 to start providing power to the power collection engine 210. For example, the second transmitter 260 may be able to provide more power or provide power more efficiently or with less loss than the first transmitter 250. The first transmitter 250 may be fully loaded or overloaded. In an example, the first and second transmitters 250, 260 may not be able to provide power simultaneously due to interference with each other. In some examples, the power collection engine 210 may stop receiving power from the first transmitter 250 before receiving power from the second transmitter 260 (e.g., a break before make transfer). The connection management engine 220 may not notify the user of the time when no power is being received. In an example, the power collection engine 260 may receive power from the second transmitter 260 before it stops receiving power from the first transmitter 250.

The decision to change which transmitter 250, 260 is providing power may be made by the connection management engine 220, made by the transmitters 250, 260, made by the backend system 270, made jointly, or the like. The connection management engine 220 may cause the power collection engine 210 to measure a characteristic of the received power or power that can potentially be received (e.g., a signal strength, an amount of power, or the like). The power collection engine 210 may perform the measurement while receiving power or may use an open time period to perform the measurement. For example, the transmitters 250, 260 may periodically or aperiodically pause delivery of power to allow for the power collection engine 210 to measure power from other transmitters 250, 260. The connection management engine 220 may determine whether to change which transmitter 250, 260 is providing power based on the measurement, or the connection management engine 220 may communicate the measurement to one of the transmitters 250, 260. In an example, when delivering power simultaneously, the transmitters 250, 260 may periodically or aperiodically pause delivery of power to allow for the power collection engine 210 to perform measurements of the received power from each transmitter individually (e.g., to detect changes in relative phase, spatial arrangement, etc. that may cause or increase interference).

The transmitters 250, 260 or the backend system 270 may analyze or log interactions between devices and the transmitters, particular events, or the like. For example, the transmitters 250, 260 or the backend system 270 may detect when a transmitter 250, 260 reaches a maximum number of devices being serviced, a maximum amount of power being delivered, or the like (e.g., an overload event). The transmitters 250, 260 or the backend system 270 may detect when a device is receiving weak signals from all nearby transmitters 250, 260, which may indicate the device is in a dead zone (e.g., a weak signal event). The transmitters 250, 260 or the backend system 270 may log how frequently such dead zone, weak signal, etc. events occur. The transmitters 250, 260 or the backend system 270 may make available or transmit the analysis or logging to administrator to allow the administrator to decide whether to add additional transmitters 250, 260.

Figure 3:
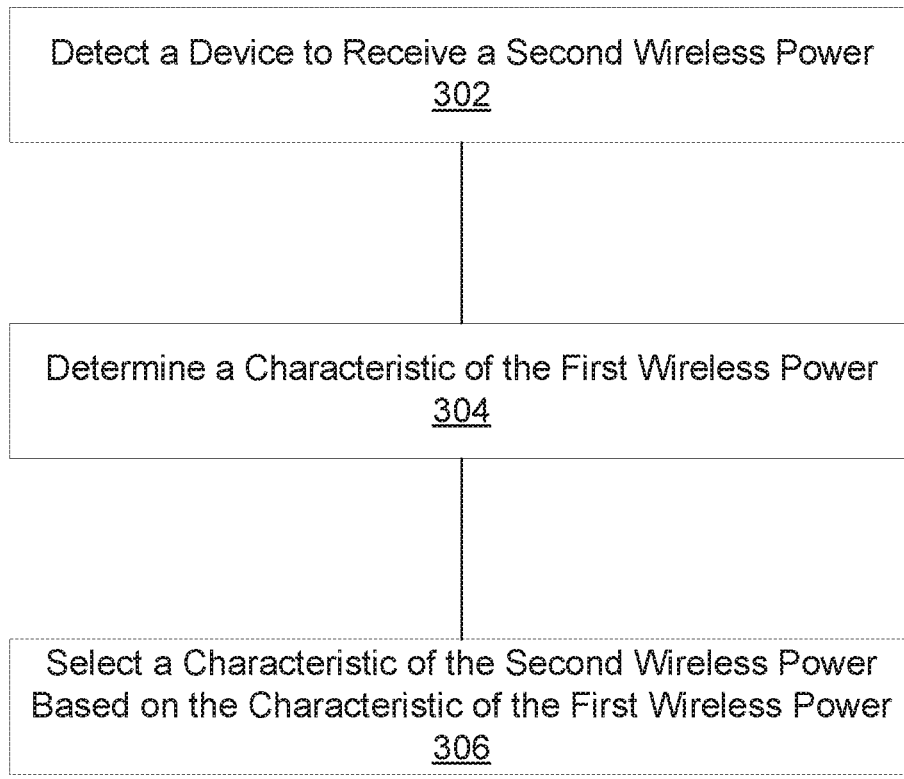
FIG. 3 is a flow diagram of an example method to efficiently deliver wireless power.

FIG. 3 is a flow diagram of an example method 300 to efficiently deliver wireless power. A processor may perform the method 300. At block 302, the method 300 may include detecting a device to receive a second wireless power. For example, the device may be detected based on a communication from the device, based on the device perturbing a signal or wireless power being transmitted, or the like. The device may be receiving a first wireless power from a first source, and the device may want to receive the second wireless power.

At block 304, the method 300 may include determining a characteristic of the first wireless power. For example, the characteristic may be determined based on a measurement of the first wireless power, a communication from the device, a communication from the first source, a communication from the backend system 270, or the like. The communication may include an indication of the characteristic. The characteristic may be inherent to the first wireless power, may depend on, e.g., a location of the device, or the like.

Block 306 may include selecting a characteristic of the second wireless power based on the characteristic of the first wireless power. For example, the characteristic of the second wireless power may be selected to prevent interference, to balance the amount of power delivered by a plurality of sources, or the like. Referring to FIG. 2, in an example, the second transmitter 260 or the backend system 270 may perform blocks 302, 304, or 306.

Figure 4:
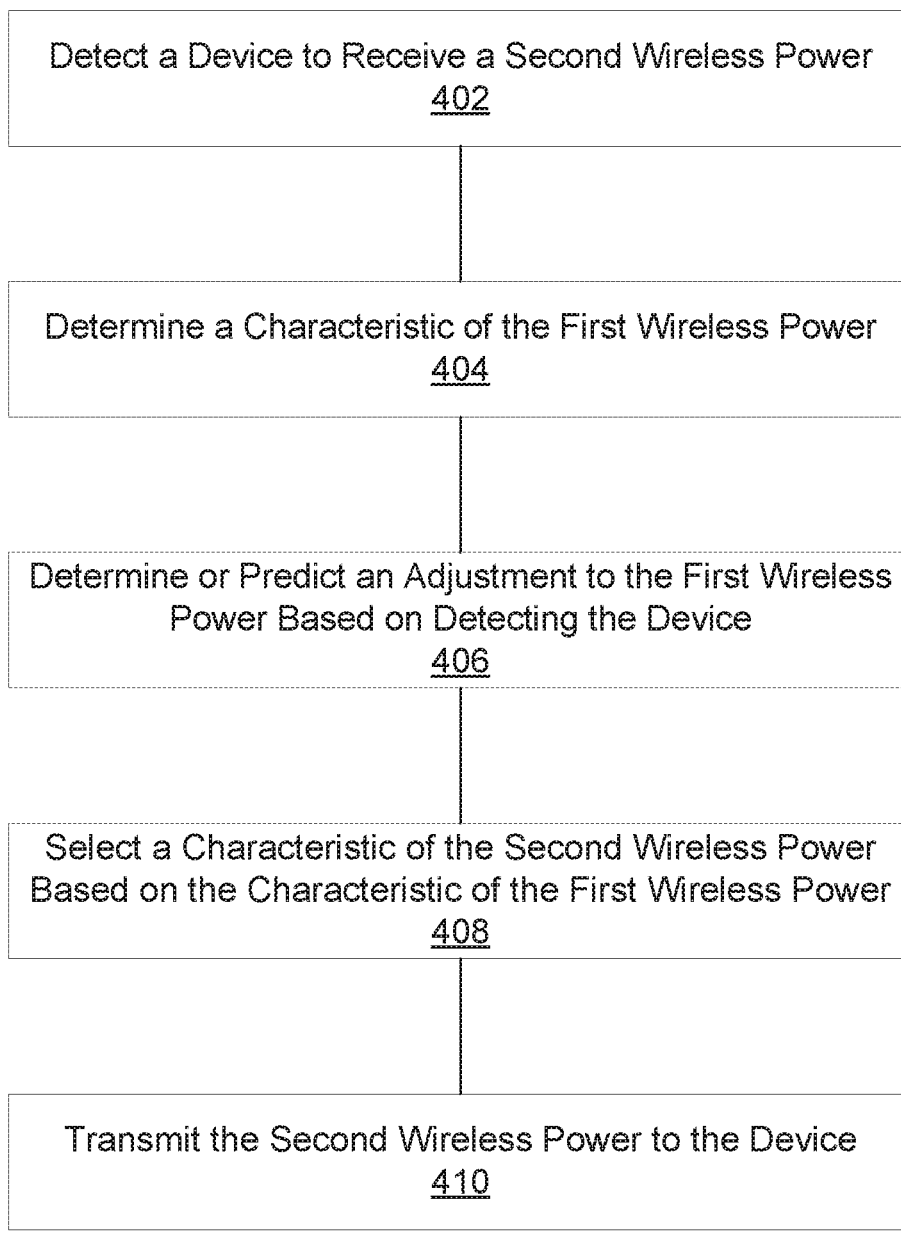
FIG. 4 is a flow diagram of another example method to efficiently deliver wireless power.

FIG. 4 is a flow diagram of another example method 400 to efficiently deliver wireless power. A processor may perform the method 400. At block 402, the method 400 may include detecting a device to receive a second wireless power. In some examples, the device may transmit a request to receive the second wireless power. Detecting the device may include receiving the request. For example, detecting the device may include continuously, periodically, or aperiodically listening for requests from device. Detecting the device may include initially broadcasting an indication that power is available (e.g., periodically, aperiodically, etc.) or transmitting power that is detected by the device. In some examples, the device may be detected based on the device perturbing a signal or wireless power being transmitted. For example, the device may increase a load on the wireless power being transmitted, and the increase in load may be detected. The device may be receiving a first wireless power, for example, when the device is detected.

At block 404, the method 400 may include determining a characteristic of the first wireless power. The characteristic may be an amount of the first wireless power being transmitted, an amount of the first wireless power being transmitted, a time, frequency, phase, or spatial arrangement of the first wireless power, a resonance parameter of the first wireless power, or the like. Determining the characteristic may include receiving an indication of the characteristic from the device, which may determine or know the characteristic. Determining the characteristic may include receiving an indication of the characteristic from a source of the first wireless power, which may determine or know the characteristic. The indication of the characteristic may be received from the source of the first wireless power via a wired connection, a wireless connection, or the like. In an example, the indication of the characteristic may be received from a backend system, which may, for example, have received the indication of the characteristic from the source of the first wireless power.

Block 406 may include determining or predicting an adjustment to the first wireless power based on detecting the device to receive the second wireless power. For example, a source of the first wireless power may reduce the amount of power being provided based on the device receiving the second wireless power. The amount of the reduction may be determined or predicted based on predetermined criteria used by a source of the first wireless power to make the adjustment. The amount of the reduction may be determined by communicating with the source of the first wireless power or a backend system. For example, the amount of the reduction may be determined based on how many devices are being provided wireless power by the source of the second wireless power or by the source of the first wireless power, the energy levels of those devices, the amount of power being provided by the source of the second wireless power or by the source of the first power, or the like.

Block 408 may include selecting a characteristic of the second wireless power based on the characteristic of the first wireless power. For example, selecting the characteristic may include selecting an amount of the second wireless power based on an amount of the first wireless power, the adjustment to the first wireless power, a predicted or expected amount of the first wireless power in the future, or the like. The device may be at a location to which the sources of the first and second wireless power can deliver power, so the amount of the second wireless power may be selected to balance a load between the source of the first wireless power and the source of the second wireless power. Selecting the characteristic may include selecting a time, frequency, phase, or spatial arrangement to prevent, minimize, or limit interference with the first wireless power. Selecting the characteristic may include selecting a resonance parameter to produce or improve a resonant coupling with the device, which may be unable to adjust the resonant parameter much or at all while continuing to receive the first wireless power. Selecting the characteristic of the second wireless power may include selecting an amount of the second wireless power based on a priority of the device or an energy level of the device as well as, or instead of, the characteristic of the first wireless power. For example, a large amount of second wireless power may be selected based on the device having a high priority or having a low energy level (e.g., a low amount or percentage of energy remaining in a rechargeable power source).

Block 410 may include transmitting the second wireless power to the device. For example, the second wireless power may be transmitted with the selected characteristics to the device. Adjustments to the characteristic of the second wireless power provided to the device may be made independently, made in coordination with the source of the first wireless power or a backend system, or the like. For example, the amount of the first or second wireless power may be reduced as the energy level of the device increases. The amount of the first or second wireless power may be increased or decreased based on fewer or more devices receiving power from the sources of the first or second wireless power. The time, frequency, phase, or spatial arrangement may be adjusted as the device changes position or fewer or more device receive power form the sources of the first or second power. In an example, the second transmitter 260 of FIG. 2 or the backend system 270 may perform blocks 402, 404, 406, 408, or 410.

Figure 5:
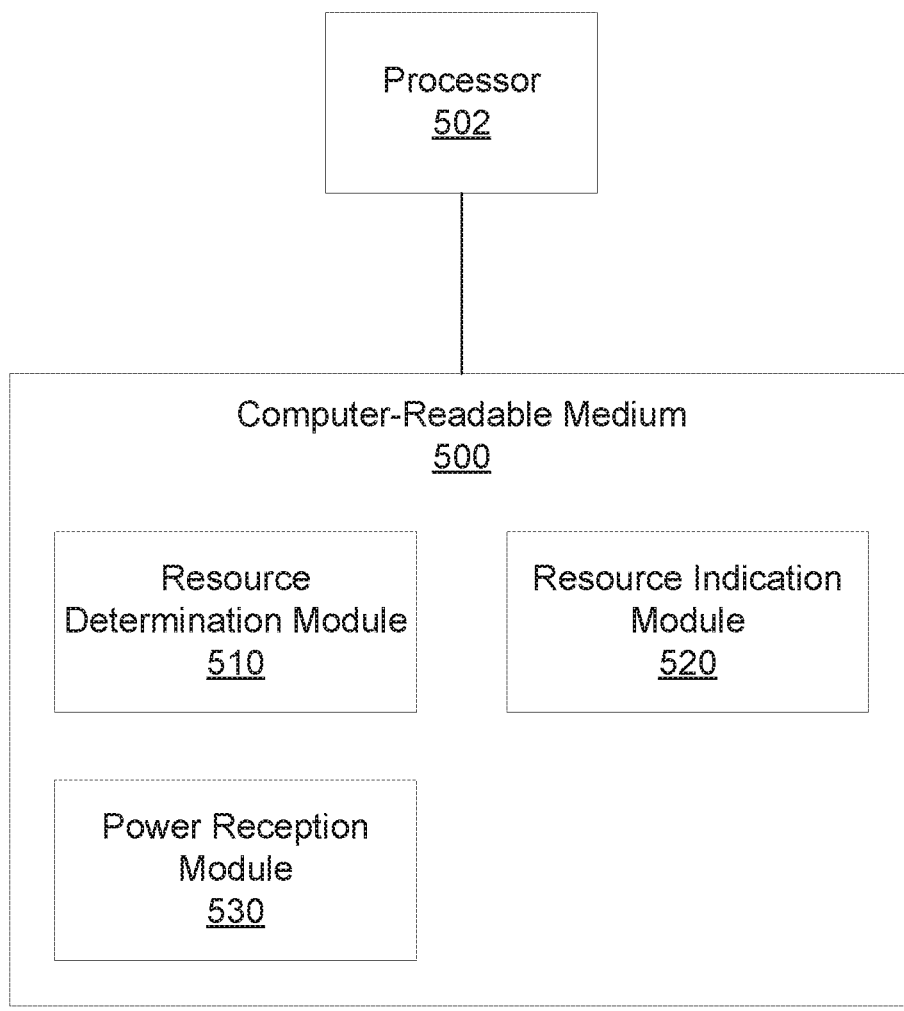
FIG. 5 is a block diagram of an example computer-readable medium including instructions that cause a processor to cause the receipt of efficiently delivered wireless power.

FIG. 5 is a block diagram of an example computer-readable medium 500 including instructions that, when executed by a processor 502, cause the processor 502 to cause the receipt of efficiently delivered wireless power. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include a resource determination module 510. As used herein, a "module" (in some examples referred to as a "software module") is a set of instructions that when executed or interpreted by a processor or stored at a processor-readable medium realizes a component or performs a method. The resource determination module 510, when executed by the processor 502, may cause the processor 502 to determine a first wireless power reception resource utilized by a first wireless power from a first transmitter. For example, a utilized resource or resources other than the utilized resource may be unavailable for use to receive power from another transmitter. The resource determination module 510 may cause the processor 502 to determine which resources are unavailable due to their utilization to receive the first wireless power.

The computer-readable medium 500 may include a resource indication module 520. The resource indication module 520 may cause the processor 502 to indicate an available wireless power reception resource to a second transmitter. The available wireless power reception resource may be different from the wireless power reception resource utilized by the first wireless power. In an example, the resource indication module 520 may cause the processor 502 to instruct a communication engine to transmit the indication of the available wireless power reception resource to the second transmitter.

The computer-readable medium 500 may include a power reception module 530. The power reception module 530 may cause the processor 502 to cause an interface to receive a second wireless power from the second transmitter. The second wireless power may utilize the available wireless power reception resource. For example, the power reception module 530 may cause the processor 502 to indicate to the interface to receive the second wireless power utilizing the available power reception resource, may configure the interface to receive the second wireless power utilizing the available power reception resource, or the like. In an example, when executed by the processor 502, the resource determination module 510, the resource indication module 520, or the power reception module 530 may realize the connection management engine 120 of FIG. 1.

Figure 6:
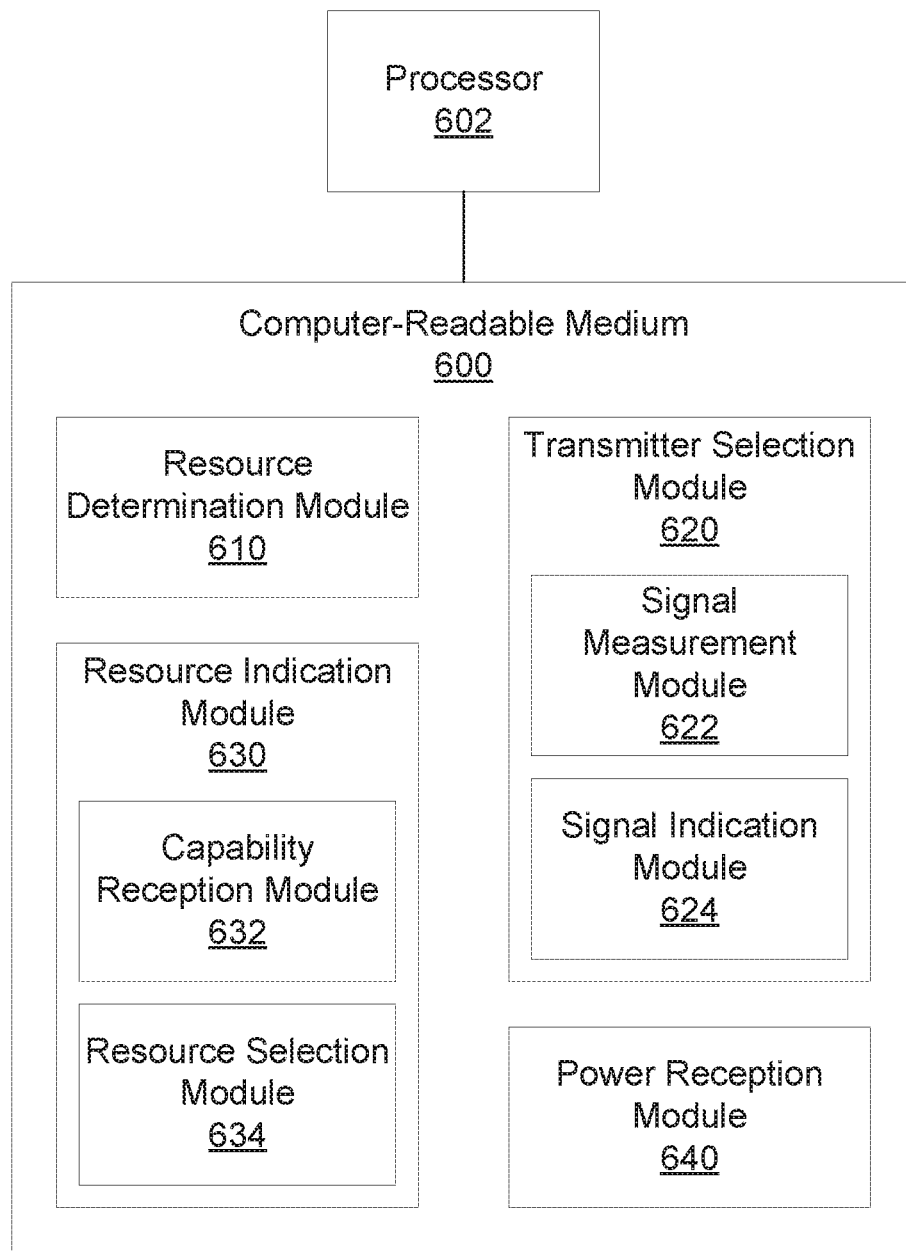
FIG. 6 is a block diagram of another example computer-readable medium including instructions that cause a processor to cause the receipt of efficiently delivered wireless power.

FIG. 6 is a block diagram of another example computer-readable medium 600 including instructions that, when executed by a processor 602, cause the processor 602 to cause the receipt of efficiently delivered wireless power. The computer-readable medium 600 may include a resource determination module 610. The resource determination module 610, when executed by the processor 602, may cause the processor 602 to determine a wireless power reception resource utilized by a first wireless power from a first transmitter. For example, the wireless power reception resource may include a time, frequency, phase, spatial arrangement, resonance parameter, or the like. The wireless power reception resource may include an interface, such as a receiving element, circuitry, or the like to receive the first wireless power. The resource determination module 610 may receive an indication from the interface of the wireless power reception resource being utilized, may retrieve an indication of the wireless power reception resource from a non-transitory computer readable medium (e.g., the computer-readable medium 600), or the like.

The computer-readable medium 600 may include a transmitter selection module 620. The transmitter selection module 620 may cause the processor 602 to decide whether to receive the second wireless power from the second transmitter. For example, the transmitter selection module 620 may cause the processor 602 to decide not to receive the second wireless power if there is too much loss during transmission of the second wireless power or the signal strength is too weak. The transmitter selection module 620 may include a signal measurement module 622. The signal measurement module 622 may cause the processor 602 to cause the interface to measure a signal strength of a signal from the second transmitter. For example, the interface may measure a signal strength after down converting the signal, an amount of power received by the interface, an efficiency or amount of power loss during transfer, or the like. The transmitter selection module 620 may cause the processor 602 to decide to receive the second wireless power from the second transmitter based on the strength of the signal being at least or more than a threshold. The threshold may be selected by a user, predetermined by a manufacturer, or the like.

The computer-readable medium 600 may include a resource indication module 630, The resource indication module 630 may cause the processor 602 to indicate an available wireless power reception resource to a second transmitter. For example, the resource indication module 630 may cause the processor 602 to determine a wireless power reception resource that will not conflict with the wireless power reception resource utilized by the first wireless power. The resource indication module 630 may cause the processor 602 to determine a time, frequency, phase, spatial arrangement, resonance parameter, receiving element, or circuit different from what is being used by the first wireless power. The resource indication module 630 may cause the processor 602 to determine a time, frequency, phase, spatial arrangement, resonance parameter, receiving element or circuit similar to or the same as what is being used by the first wireless power. The resource indication module 630 may cause the processor 602 to instruct the interface or a communication engine to transmit an indication of the available wireless power reception resource to the second transmitter.

The resource indication module 630 may include a capability reception module 632. The capability reception module 632 may cause the processor 602 to receive an indication of capabilities of the second transmitter. For example, the second transmitter may transmit an indication of its capabilities to the interface or the communication engine, and the capability resource module 632 may cause the processor 602 to receive the indication of the capabilities from the interface or the communication engine. The indication of the capabilities may include an indication of supported timings, frequencies, phases, spatial arrangements, resonance parameters, etc. The resource indication module 630 may include a resource selection module 634. The resource selection module 634 may cause the processor 602 to select the available wireless power reception resource based on the capabilities of the second transmitter. For example, the resource selection module 634 may cause the processor 602 to compare the capabilities of the second transmitter to a plurality or all of the available wireless power reception resources. The resource selection module 634 may cause the processor 602 to select an available wireless power reception resource within the capabilities of the second transmitter. The resource indication module 630 may cause the processor 602 to indicate the selected wireless power reception resource to the second transmitter.

In an example; the resource selection module 634 may cause the processor 602 to determine the second transmitter is capable of using a wireless power reception resource utilized by the first wireless power from the first transmitter. The resource selection module 634 may cause the processor 602 to determine that the second transmitter is capable of using a wireless power reception resource that will conflict the wireless power reception resource utilized by the first wireless power. For example, the wireless power reception resources may interfere, may be mutually exclusive (e.g., use of one may preclude use of the other), or the like. The signal measurement module 622 may cause the processor 602 to determine a strength of a signal from the first transmitter is below a strength of a signal from the second transmitter. For example, the signal measurement module 622 may cause the processor 602 to compare the signal strength of a down converted signal, an amount of power received, an efficiency or amount of power lost during transfer, or the like between the signal from the first transmitter and the signal from the second transmitter (e.g., between the first wireless power and the second wireless power). The signal measurement module 622 may cause the processor 602 to determine from which transmitter to receive power based on the comparison. The signal measurement module 622 may cause the processor 602 to select the transmitter with a stronger signal; that will deliver more power; that will deliver power more efficiently or with less loss, or the like.

Based on the results of the comparison, the resource indication module 630 may cause the processor 602 to communicate with the transmitters to receive power from the selected transmitter. Based on a determination the signal from the second transmitter is stronger, the resource indication module 630 may cause the processor 602 to indicate to the second transmitter the wireless power reception resource utilized by the first wireless power from the first transmitter as the available wireless power reception resource. The resource indication module 630 may cause the processor 602 to indicate to the first transmitter to stop using the wireless power reception resource utilized by the first wireless power. Based on a determination the signal from the first transmitter is stronger, the resource indication module 630 may cause the processor 602 to indicate to the second transmitter that no wireless power reception resources are available. The first transmitter may continue to deliver the first wireless power using the same wireless power reception resource.

The computer-readable medium 600 may include a power reception module 640, The power reception module 640 may cause the processor 602 to cause the interface to receive the second wireless power from the second transmitter. The second wireless power may utilize the available wireless power reception resource, e.g., indicated by the resource indication module 630. For example, the power reception module 640 may cause the processor 602 to indicate to the interface to receive the second wireless power using the available wireless power reception resource. The interface may adjust parameters used to receive the second wireless power accordingly. In an example, the power reception module 640 may cause the processor 602 to adjust the parameters used to receive the second wireless power directly. The adjusted parameters may include timing, filter or matching circuit values, spatial arrangement, or the like.

The transmitter selection module 620 may include a signal indication module 624. The signal indication module 624 may cause the processor 602 to indicate to the second transmitter a strength of a signal from the transmitter and a strength of a signal from the second transmitter. For example, the signal indication module 624 may cause the processor 602 to transmit a strength of a down-converted signal, an amount of power received, an efficiency or amount of power lost during transfer, or the like for both transmitters, which may have been measured by the signal measurement module 622. The signal indication module 624 may cause the processor 602 to also, or instead, indicate the measurements to the first transmitter. In some examples, the first and second transmitters may be communicatively coupled directly or through a backend system, so the signal indication module 624 may cause the processor 602 to indicate the measurements to one transmitter but not another.

The power reception module 640 may cause the processor 602 to cause the interface to receive an amount of the second wireless power selected based on the strength of the signal from the first transmitter and the strength of the signal from the second transmitter. For example, the second transmitter may select how much wireless power to transmit based on the strengths of the signals from the first and second transmitters. The power reception module 640 may cause the processor 602 to cause the interface to receive the second wireless power, which the interface may receive with the amount of power selected by the second transmitter. The first transmitter may also, or instead, select how much wireless power to transmit based on the strengths of the signals from the first and second transmitters. The power reception module 640 may cause the processor 602 to cause the interface to receive the first wireless power with the amount of power selected by the first transmitter.

The above description is illustrative of various principles and implementations of the present disclosure. Numerous variations and modifications to the examples described herein are envisioned. Accordingly, the scope of the present application should be determined only by the following claims.

What is claimed is:

1. A system comprising:
   a power collection engine to convert wireless electromagnetic energy into wired electrical energy; and
   a connection management engine to:
      communicate with a first transmitter to request the first transmitter provide first power, to communicate authentication information to the first transmitter, and to cause the first transmitter to provide the first power to the power collection engine, and communicate with a second transmitter to cause the second transmitter to provide second power concurrently with the first power to the power collection engine, the second power having an amount determined by the connection management engine according to an amount of the first power to enable the second transmitter to provide the second power concurrently with the first power to mitigate interference with the first power and to enable the second power to be combinable with the first power to form a power signal for the system, wherein the power collection engine is to form the wired electrical energy from the first power and the second power concurrently received.

2. The system of claim 1, wherein the connection management engine is to communicate with the second transmitter to cause the second transmitter to provide the second power in a time, a frequency, or a spatial arrangement different than that of the first power.

3. The system of claim 1, wherein the connection management engine is to transmit a characteristic of the first power to the second transmitter, and wherein the characteristic is usable to avoid interfering with the first power.

4. The system of claim 1, wherein the connection management engine is to indicate an amount of the second power to the first transmitter, and wherein the power collection engine is to receive an adjusted first power from the first transmitter based on the amount of the second power.

5. The system of claim 1, wherein the power collection engine comprises a first interface to receive the first power and a second interface to receive the second power, and wherein the system further comprises a power combination engine electrically coupled to the first and second interfaces, the power combination engine to combine the first and second power.

6. A method, comprising:
detecting a device to receive a second wireless power, wherein the device is receiving a first wireless power;
determining an amount of the first wireless power; and
selecting a characteristic of the second wireless power based on the amount of the first wireless power;
controlling a second wireless transmitter to provide the second wireless power having an amount determined according to the amount of the first wireless power, the second characteristic to enable the second transmitter to provide the second wireless power concurrently with the first wireless power, to mitigate interference with the first wireless power and to enable the second wireless power to be combinable with the second wireless power to form a power signal for the device.

7. The method of claim 6, further comprising selecting a time, a frequency, or a spatial arrangement for the second wireless power based on a time, a frequency, or a spatial arrangement for the first wireless power.

8. The method of claim 6, wherein selecting the characteristic of the second wireless power comprises selecting the amount of the second wireless power based on a priority of the device and an energy level of the device.

9. The method of claim 6, further comprising determining an adjustment to the first wireless power based on detecting the device to receive the second wireless power, wherein selecting the characteristic of the second wireless power comprises selecting the characteristic of the second wireless power based on the adjustment to the first wireless power.

10. A non-transitory computer-readable medium comprising instructions that, when executed by a processor, cause the processor to:
determine a wireless power reception resource utilized by a first wireless power from a first transmitter;
indicate an available wireless power reception resource to a second transmitter;
indicate to the second transmitter a strength of a signal from the first transmitter and a strength of a signal from the second transmitter; and
cause an interface to receive an amount of second wireless power from the second transmitter concurrently with receiving the first wireless power, the amount of second wireless power selected based on the strength of the signal from the first transmitter and the strength of the signal from the second transmitter, the second wireless power utilizing the available wireless power reception resource to enable the second wireless power to be combined with the second wireless power to form a power signal.

11. The computer-readable medium of claim 10, wherein the instructions cause the processor to:
receive an indication of capabilities of the second transmitter; and
select the available wireless power reception resource based on the capabilities of the second transmitter.

12. The computer-readable medium of claim 10, wherein the instructions cause the processor to:
cause the interface to measure a strength of a signal from the second transmitter; and
decide to receive the second wireless power from the second transmitter based on the strength of the signal being at least or more than a threshold.

13. The computer-readable medium of claim 10, wherein the instructions cause the processor to:
determine the second transmitter is capable of using a wireless power reception resource utilized by the first wireless power from the first transmitter;
determine a strength of a signal from the first transmitter is below a strength of a signal from the second transmitter;
indicate the available wireless power reception resource by indicating the wireless power reception resource utilized by the first wireless power from the first transmitter.

* * * * *